No. 869,299. PATENTED OCT. 29, 1907.
L. W. FAIR.
HARROW TOOTH.
APPLICATION FILED FEB. 11, 1907.
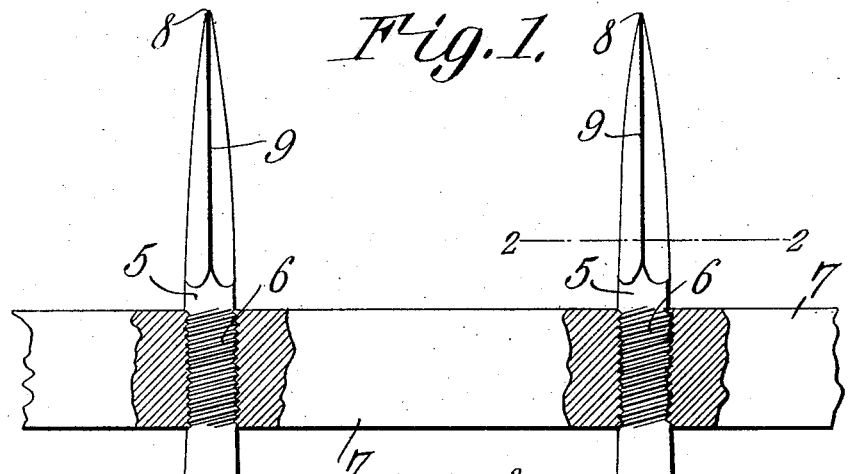
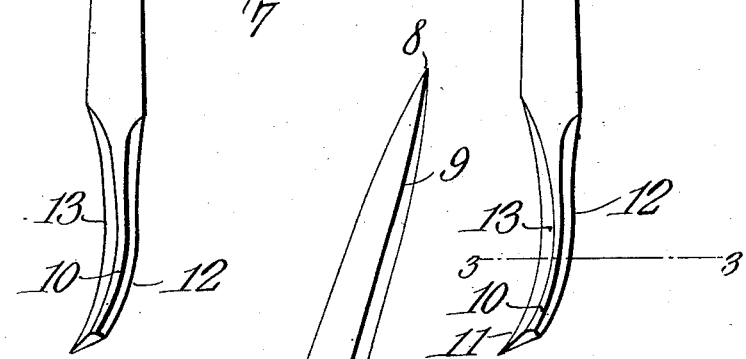
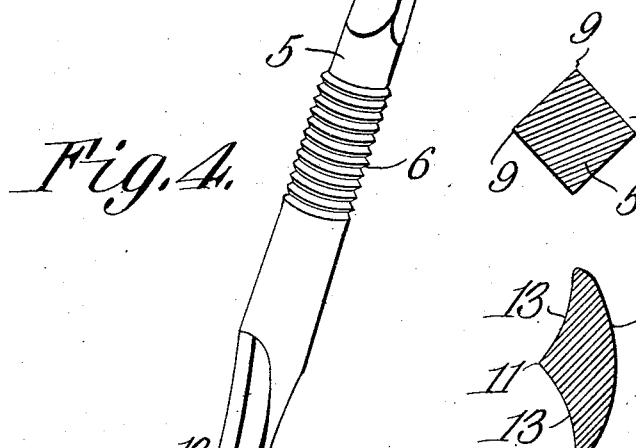
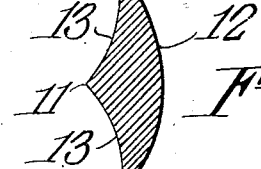
Lewis W. Fair,
INVENTOR.
WITNESSES:
By C. A. Snow & Co.
ATTORNEYS
THE NORRIS PETERS CO., WASHINGTON, D. C.

UNITED STATES PATENT OFFICE.

LEWIS W. FAIR, OF WALDRON, ARKANSAS.

HARROW-TOOTH.

No. 869,299.  Specification of Letters Patent.  Patented Oct. 29, 1907.

Application filed February 11, 1907. Serial No. 356,819.

*To all whom it may concern:*

Be it known that I, LEWIS W. FAIR, a citizen of the United States, residing at Waldron, in the county of Scott and State of Arkansas, have invented a new and useful Harrow-Tooth, of which the following is a specification.

This invention relates to harrow teeth and has for its object to provide a strong durable tooth having one end thereof provided with a pointed terminal and its opposite end formed with a cultivator blade so that by inverting the harrow or reversing the tooth either end of the latter may be presented to the soil.

A further object of the invention is to provide a harrow tooth having its intermediate portion threaded for engagement with the harrow frame and its pointed terminal provided with angular cutting faces whereby the tooth may be detachably secured to the frame and said tooth rotated in the latter so as to expose any particular cutting face.

A still further object of the invention is to generally improve this class of devices so as to increase their utility, durability and efficiency as well as to reduce the cost of manufacture.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification: Figure 1 is a side elevation partly in section of a portion of a harrow frame showing a tooth constructed in accordance with my invention in position thereon. Fig. 2 is a transverse sectional view taken on the line 2—2 of Fig. 1. Fig. 3 is a similar view taken on the line 3—3 of Fig. 1. Fig. 4 is a perspective view of the harrow tooth detached.

Similar numerals of reference indicate corresponding parts in all of the figures of the drawings.

The tooth consists of a body portion 5 preferably cylindrical in form and having its opposite ends tapered and its intermediate portion threaded at 6 for engagement with the tooth-carrying bar 7 of the harrow frame.

One end of the body portion is inclined or beveled to form a terminal point 8 defining a plurality of cutting faces 9 for engagement with the soil, said body portion being mounted for rotation in the bar 7 so as to present any particular cutting face to the soil.

The opposite end of the body portion is flattened and the terminal thereof bent or curved laterally to form a cultivator blade 10, the end of the blade being inclined or beveled in opposite directions to form a cutting edge 11.

The rear face of the cultivator blade 10 is convex or rounded, as indicated at 12 while the forward face thereof is inclined or beveled in opposite directions towards the longitudinal edges of the blade to form inclined faces 13 which serve to deflect the soil on each side of the cultivator blade as the latter is drawn through said soil.

By having the tooth threaded in the harrow frame in the manner described, said tooth may be readily rotated within the frame and also detached from the frame and reversed so that either working end of the tooth may be presented to the ground. If desired, however, the handles of the harrow frame may be removed and the latter inverted so as to present either working end of the teeth to the ground without the necessity of removing and reversing the position of said teeth. The teeth may also be adjusted vertically of the frame by rotating the teeth within the frame thereby to regulate the depth of cut by said teeth.

The harrow teeth may be used in connection with either wood or iron frames and when the latter are employed suitable openings are preferably formed in the frame and threaded for engagement with the threads on the teeth.

From the foregoing description in will be seen that there is provided an extremely simple, inexpensive and efficient device admirably adapted for the attainment of the ends in view.

Having thus described the invention what is claimed is:

1. A harrow tooth comprising a body portion having different working ends and provided with intermediate threads.

2. A harrow tooth comprising a body portion having tapering working ends and provided with intermediate threads.

3. A reversible harrow tooth comprising a cylindrical body portion having intermediate threads and provided with different working ends.

4. A harrow tooth comprising a body portion having one end thereof provided with a pointed terminal defining angular cutting faces and its opposite end provided with a cultivator blade, the intermediate portion of the tooth being threaded.

5. A harrow tooth comprising a body portion having one end thereof pointed and provided with angularly disposed cutting faces and its opposite end flattened and curved laterally to form a cultivator blade, the intermediate portion of the teeth being threaded.

6. A harrow tooth comprising a cylindrical body portion having one end thereof provided with a pointed terminal defining a plurality of cutting faces and its opposite end flattened and curved laterally to form a cultivator blade, the active face of the cultivator blade being inclined in opposite directions to form soil deflecting surfaces, there being threads formed on the intermediate portion of the tooth.

7. A harrow tooth comprising a body portion having one end thereof inclined or beveled to form a plurality of angularly disposed cutting faces terminating in a point and its opposite end flattened and curved to form a cultivator blade, the rear face of the blade being substantially semicircular in cross section and the active face thereof inclined in opposite directions to form soil deflecting surfaces, there being threads formed on the body portion between the pointed terminal and the cultivator blade.

8. The combination with a harrow frame, of a tooth threaded in said frame and provided with different working ends.

9. The combination with a harrow frame, of a reversible tooth threaded in said frame and having one end thereof inclined to form a plurality of angular cutting faces terminating in a point and its opposite end flattened and curved laterally to form a cultivator blade, said tooth being adjustable vertically of the frame.

In testimony that I claim the foregoing as my own, I have hereto affixed my signature in the presence of two witnesses.

LEWIS W. FAIR.

Witnesses:
CHAS. P. BAILEY,
WM. U. SANDERS.